Patented Nov. 16, 1937

2,099,360

UNITED STATES PATENT OFFICE 2,099,360

PROCESS OF PRODUCING PURE ALUMINA AND CRUDE POTASSIUM SULPHATE FROM ALUNITE

Sadao Yonemura, Koishikawa-ku, Tokyo, Tsuruji Okazawa, Shibuya-ku, Tokyo, and Kota Osada, Sakai, Edogawa-ku, Tokyo, Japan, assignors to Nihon Denki Kogyo Kabushiki Kaisha, Tokyo, Japan No Drawing. Application May 24, 1935, Serial No. 23,334. In Japan March 6, 1934

3 Claims. (Cl. 23—141)

This invention relates to a process of producing pule alumina and crude potassium sulphate from alunite, and consists in pulverizing alunite without calcining, adding thereto caustic potash in the form of approximately 20% to 50% solution, the quantity of said caustic potash being the quantity sufficient to form potassium sulphate with sulphuric tri-oxide combined with alumina in the alunite plus the quantity equal to or up to 1.5 times of the quantity of the alumina contained in said alunite, then heating the mixture at the temperature of from 100° to 180° C. while being agitated, thereby converting all sulphuric tri-oxide contained in the alunite into potassium sulphate and at the same time converting the alumina into potassium aluminate solution, the potassium sulphate being crystallized out in the solution of potassium aluminate and forming, with all of insoluble silicic acid content and other impurities, crude potassium sulphate separating from the solution of potassium aluminate, and then producing from the latter pure hydrated alumina by agitation, and in turn to pure alumina by calcining same.

The object of this invention is to produce substantially pure alumina from alunite by an extremely simple operation at a lower cost of manufacture, and at the same time producing crude potassium sulphate as a by-product.

In carrying out this invention, alunite without being calcined is pulverized preferably into powder of less than 60 meshes, and thereto is added caustic potash in the form of approximately 20% to 50% solution. The quantity of the caustic potash added to alunite is the quantity sufficient to form potassium sulphate with sulphuric acid radical, that is sulphuric tri-oxide or $SO_3$, combined with alumina in the alunite, plus the quantity equal to or up to 1.5 times of the quantity of the alumina contained in the alunite employed. The mixture is then introduced in a closed heating vessel, and is heated to a temperature of from 100° to 180° C. while being agitated. Thus, alunite undergoes reaction with caustic potash, and produces potassium sulphate and potassium aluminate according to the following chemical equation:

$$K_2SO_4-Al_2(SO_4)_3.4Al(OH)_3+12KOH= 4K_2SO_4+6KAlO_2+12H_2O$$

We have found, in the reaction effected under the condition above referred to, that the silicic acid contained in the alunite is substantially unaffected by caustic potash and remains insoluble, and that this fact is comparable with the fact that the silicic acid content in calcined alunite is not affected by caustic potash. The above-mentioned reaction is continued for about one or two hours and, on completion of the reaction, the product is taken out of the heating vessel. As potassium sulphate is substantially insoluble, the greater part thereof is crystallized out and is separated from potassium aluminate solution together with the insoluble silicic acid content and other insoluble impurities, so that crude potassium sulphate is here produced. When the above-mentioned reaction product is cooled, the solubility of potassium sulphate is remarkably lowered when a 20 to 50% solution of caustic potash is employed, showing, for instance, the solubility of 0.5% in 30% solution of potassium aluminate at 10° C. Thus, it is preferred that the separation of potassium sulphate from potassium aluminate solution be effected after cooling same.

The potassium aluminate solution obtained in the above process may be diluted to a desired concentration with the addition of water if a comparatively concentrated solution, say 50% solution of caustic potash is employed, and from which aluminium hydroxide is readily deposited by agitation, and same is collected by filtration, washed, and calcined to produce alumina. The mother liquor obtained by said filtration can be re-used, with the addition of a fresh quantity of caustic potash, for the initial step of treating the raw material of alunite.

The crude potassium sulphate separated in the above-mentioned process containing silicic acid and other impurities may be directly used as a fertilizer. But, when it is desired to obtain pure product, said crude potassium sulphate is dissolved in water, and may be readily converted into pure potassium sulphate by removing insoluble substances. Further, from said product caustic potash may be produced by a usual process such as Leblanc process, and same may be used for the treatment of the raw material.

According to this invention, as hereinbefore described, the sulphuric acid radical in alunite is all separated as potassium sulphate by a simplest process, and at the same time insoluble silicic acid content is also separated and alumina is dissolved as potassium aluminate. Thus, in contradistinction to the heretofore proposed processes of producing alumina from alunite according to alkali process, the process according to this invention possesses two important advantages that there is no necessity of calcining the alunite to remove the water, and that the operation can be extremely simplified with no loss of alkali employed in the operation, inasmuch as the same alkali is used for removing sulphuric acid radical as well as for dissolving alumina. Moreover, according to this invention, crude potassium sulphate as the by-product may be utilized as a fertilizer, so that the process of producing substantially pure alumina can be carried out at a lower cost of manufacture compared with any other known processes.

Now, the mode of carrying out this invention will be described more fully.

An example of the composition of the alunite employed in this invention is as follows:—

| | Percent |
|---|---|
| $SiO_2$ | 10.0 |
| $SO_3$ | 36.7 |
| $Fe_2O_3$ | 1.0 |
| $Al_2O_3$ | 32.0 |
| $K_2O$ | 6.6 |
| Ignition loss | 42.0 |

Said alunite without being calcined is pulverized into powder of less than 60 meshes. Taking 1 kg. of said alunite powder, 0.85 kg. of caustic potash dissolved in 2.0 kg. of water is added. The mixture is then heated up to 150° C. while being agitated. Such heating is continued for from one to two hours and after stopping the heating, the product is cooled to room temperature and is filtered to effect separation. By such operation, we obtained 1.08 kg. of crude potassium sulphate of the nature before mentioned, of which 0.75 kg. is crystal of potassium sulphate, the remainder being water, siliceous substance, and small quantities of sodium sulphate and other impurities. The solution obtained by filtration amounts to 2.23 litres, and this contains the following compositions:

| | Kilogram |
|---|---|
| KOH | 0.38 |
| $K_2CO_3$ | 0.065 |
| $K_2SO_4$ | 0.020 |
| $Al_2O_3$ | 0.282 |

To said solution is added the equal quantity of water and the seed of 10 gr. of crystalline hydrated alumina, and this is agitated for 48 hours maintaining same at the temperature of about 30° C. The product is then filtered, completely washed, calcined and whereby about 0.20 kg. of alumina is obtained. The composition of the alumina thus obtained is:—

| | Percent |
|---|---|
| $Al_2O_3$ | 99.75 |
| $Fe_2O_3$ | 0.02 |
| $SiO_2$ | 0.01 |
| $K_2O$ | 0.05 |
| Ignition loss | 0.17 |

The aluminium hydroxide is of crystalline nature, so that the filtration and washing thereof can be very easily effected.

The mother liquor from which the precipitate of aluminium hydroxide has been separated by filtration is concentrated to the original concentration and, with a necessary quantity of caustic potash, the same may be re-used for treating alunite. We have found by experiments that such solution can be re-used more than ten times, without affecting the solubility of alumina in the alunite, or without affecting the quantity of hydrated alumina produced from the solution of potassium aluminate.

What we claim is:

1. A process for producing substantially pure alumina and crude potassium sulphate from alunite which consists in pulverizing the alunite, adding thereto a 20% to 50% solution of caustic potash, the quantity of potash being sufficient to form potassium sulphate with the sulphur trioxide combined with the alumina in the alunite plus a quantity equal to 1 to 1.5 times the quantity of alumina, heating the solution to 100° C. to 180° C. while agitating same until the sulphur trioxide and alumina are converted respectively into potassium sulphate and potassium aluminate, cooling the solution to precipitate the potassium sulphate, filtering off the precipitated potassium sulphate together with the insoluble silicic acid and other insoluble residues, adding to the filtrate a quantity of water equal to the quantity of filtrate and in addition seed crystals of aluminum hydroxide, agitating the solution to precipitate aluminum hydroxide, filtering off the precipitate and finally calcining the aluminum hydroxide to produce alumina.

2. A process according to claim 1 wherein caustic potash is produced from the crude potassium sulphate obtained in the process as a by-product, and the same is re-used for treating the alunite.

3. A process according to claim 1 wherein the filtrate containing caustic potash obtained after filtering off the aluminum hydroxide is used repeatedly.

SADAO YONEMURA.
TSURUJI OKAZAWA.
KOTA OSADA.